(12) United States Patent
Sanbongi et al.

(10) Patent No.: US 6,661,529 B2
(45) Date of Patent: *Dec. 9, 2003

(54) IMAGE DATA PROCESSING SYSTEM

(75) Inventors: Masao Sanbongi, Tachikawa (JP); Minoru Tagi, Fuchu (JP)

(73) Assignee: Casio Computer Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 256 days.

(21) Appl. No.: 09/101,664
(22) PCT Filed: Dec. 15, 1997
(86) PCT No.: PCT/JP97/04603
§ 371 (c)(1), (2), (4) Date: Jul. 14, 1998
(87) PCT Pub. No.: WO98/30019
PCT Pub. Date: Jul. 9, 1998

(65) Prior Publication Data
US 2001/0019420 A1 Sep. 6, 2001

(30) Foreign Application Priority Data
Dec. 25, 1996 (JP) .............................. 8-346201

(51) Int. Cl.[7] .................................. H04N 1/04
(52) U.S. Cl. ............ 358/1.15; 358/487; 358/506; 358/527; 358/452
(58) Field of Search ............... 358/487, 506, 358/527, 452, 1.15, 467, 407, 471, 476; 382/312; 348/158, 232; 396/310; 354/106; 364/420

(56) References Cited

U.S. PATENT DOCUMENTS

| | | | |
|---|---|---|---|
| 5,016,107 A | | 5/1991 | Sasson et al. |
| 5,124,915 A | * | 6/1992 | Krenzel ...................... 364/420 |
| 5,148,197 A | | 9/1992 | Kunishige |
| 5,164,831 A | | 11/1992 | Kuchta et al. |
| 5,267,333 A | | 11/1993 | Aono et al. |
| 5,272,549 A | * | 12/1993 | McDonald .................. 358/527 |
| 5,301,026 A | | 4/1994 | Lee |
| 5,327,265 A | | 7/1994 | McDonald |
| 5,335,072 A | * | 8/1994 | Tanaka et al. .............. 348/232 |
| 5,376,981 A | | 12/1994 | Itoh |
| 5,469,237 A | | 11/1995 | Itoh et al. |
| 5,506,644 A | * | 4/1996 | Suzuki et al. ............... 354/106 |
| 5,526,078 A | | 6/1996 | Itoh et al. |
| 5,526,079 A | | 6/1996 | Goto et al. |
| 5,581,299 A | | 12/1996 | Raney |
| 5,581,311 A | | 12/1996 | Kuroiwa |
| 5,712,679 A | * | 1/1998 | Coles .......................... 348/158 |
| 5,768,640 A | * | 6/1998 | Takahashi et al. .......... 396/310 |
| 5,864,411 A | * | 1/1999 | Norris ........................ 358/527 |
| 6,167,469 A | * | 12/2000 | Safai et al. .................. 710/62 |

FOREIGN PATENT DOCUMENTS

EP  0 650 125 A1  4/1995

* cited by examiner

Primary Examiner—Thomas D. Lee

(57) ABSTRACT

An image data processing system includes a PDA (2), an image data processing unit (3) for editing image data created by the PDA, and a personal computer. The above units include communication units (16, 35, 47) which can communicate with one another via a communication line a. The PDA includes an image input unit (12) for creating the image data of a subject, image data-related information creating means (20) for creating information related to the image data, and an input unit (14) for determining an output format of image data and the like. The image data processing unit (3) includes a data storage unit (34) for storing received image data and the like, a CPU (31) for editing image data based on an input of output format information, and a printer (5) for outputting the edited image data. The personal computer (4) includes a CPU (41) for editing received image data.

20 Claims, 15 Drawing Sheets

| IMAGE | TIME | PLACE | VERTICAL/ HORIZONTAL | COMMENT | NUMBER OF IMAGES | CATEGORY |
|---|---|---|---|---|---|---|
| | | | | | | |
| | | | | | | |
| | | | | | | |
| | | | | | | |
| | | | | | | |
| | | | | | | |
| | | | | | | |
| | | | | | | |

| 50 | 51 | 52 | 53 | 54 | 55 | 56 | 79 | 81 |
|---|---|---|---|---|---|---|---|---|
| IMAGE | TIME | PLACE | VERTICAL/ HORIZONTAL | COMMENT | NUMBER OF IMAGES | CATEGORY | AZIMUTH | OTHERS |
| | | | | | | | | |
| | | | | | | | | |
| ------- | ------- | ------- | ------- | ------- | ------- | ------- | ------- | ------- |

FIG. 16

| DB | 83 | 85 |
|---|---|---|
| | POSITION | GEOGRAPHICAL DATA |
| | 35° 39′ 17″ N,L, LONG. 60° 15′ E | KOFU |

| DB | 87 | 89 | 91 |
|---|---|---|---|
| | POSITION | AZIMUTH | GEOGRAPHICAL DATA |
| | 35° 39′ 17″ N,L, LONG. 60° 15′ E | NORTH | Mt.FIJI |
| | | SOUTH | ×× × |
| | | WEST | ×× × |
| | | EAST | ×× × |

IMAGE DATA PROCESSING SYSTEM

TECHNICAL FIELD

The entire contents of Japanese Patent Application No. 8-346201 filed on Dec. 25, 1996 are incorporated herein by reference.

BACKGROUND ART

Recently, digital cameras (electronic cameras) for electrically storing photographed images instead of using films have been widely used. In such a digital camera, when the shutter release is depressed to issue an instruction of fetching an image of a subject, the image is electrically fetched by use of a solid state imaging device such as a CCD, the fetched image is compressed by the compression processing technique such as JPEG, and the compressed still image is stored in a solid state memory such as a flash memory.

The digital camera has a function of permitting a photographed image to be recognized on the spot and is excellent in quick adaptability in comparison with a conventional camera which uses a film for photographing and in which the photographed image cannot be observed until it is developed and printed.

Further, recently, a device obtained by attaching the above digital camera function to a device having a PDA (Personal Digital Assistant) function such as a personal digital assistant is also commercialized and it is possible to transmit photographed image data to another place via a telephone line.

However, in the digital camera with the image data transmitting function, the photographed data is transmitted to a personal computer at a user's home and then the image data is processed by use of the personal computer, but since the image data processing is largely dependent on the image data processing capability of the personal computer, the added value of image data purposely photographed cannot be fully utilized in some cases.

DISCLOSURE OF INVENTION

An object of this invention is to provide an image data processing system capable of utilizing the function of transmitting photographed image data and permitting anybody to fully utilize the added value of the image data.

According to a first aspect of this invention, an image data processing system comprises a photographing unit including photographing means for photographing a subject to create image data; and transmission means for transmitting the image data via a communication line; and a center unit including reception means for receiving image data transmitted from the photographing unit via the communication line; storage means for storing image data received by the reception means; editing means for editing image data stored in the storage means; and output means for outputting image data edited by the editing means.

According to a second aspect of this invention, an image data processing device comprises communication means for transmitting and receiving data with respect to a terminal unit connected to a network; storage means for storing image data received via the communication means; editing means for editing image data stored in the storage means; and output means for outputting image data edited by the editing means.

According to this invention, the image data processing system receives and stores photographed image data from a terminal unit such as a PDA connected via the network. After the stored image data is edited according to a request, the image data is output to an output unit such as a printer.

Therefore, the image data and the like created in the photographing unit can be edited according to an output format which the user desires and output in a preset output format, thus the output format is not influenced by the function of the terminal unit of the user unlike the conventional case, and the added value of photographed image data can be fully utilized.

Further, for example, when the user makes a journey and if the user previously transmits photographed image data and the like to a center (having a center unit) near the user's home and designates an output in a desired output format, it becomes possible for the user to drop in the center on the way home from the journey and take an output material (for example, album) home, and thus it becomes unnecessary for the user to edit the image data and the like by himself, it becomes convenient and the user can immediately see the output result.

Further, since the image data and the like photographed by the photographing unit can be transmitted to the terminal unit and reedited after they were edited by the center unit, for example, the user can remove unnecessary image data, or change or add text information such as a comment or title by use of a terminal unit provided at his home or the like and he can edit the photographed image data to his satisfaction.

Further, according to this invention, noted places, buildings, place names and the like are stored in connection with position data in a data base on the server side. Therefore, it becomes possible to receive information of position and information of azimuth measured by use of a GPS or azimuth sensor provided in the PDA together with photographing data and display information (noted place, building, place name and the like) associated with the photographing place based on corresponding information of photographing position, photographing azimuth and the like by referring to the data base. Therefore, an album with large added value can be made.

BRIEF DESCRIPTION OF DRAWINGS

FIG. 16 is a diagram showing the memory configuration of a server in the embodiment shown in FIG. 14;

BEST MODE OF CARRYING OUT THE INVENTION

There will now be described an embodiment of an image data processing system according to this invention in detail with reference to FIGS. 1 to 22C.

First, the construction is explained.

Figure 1:
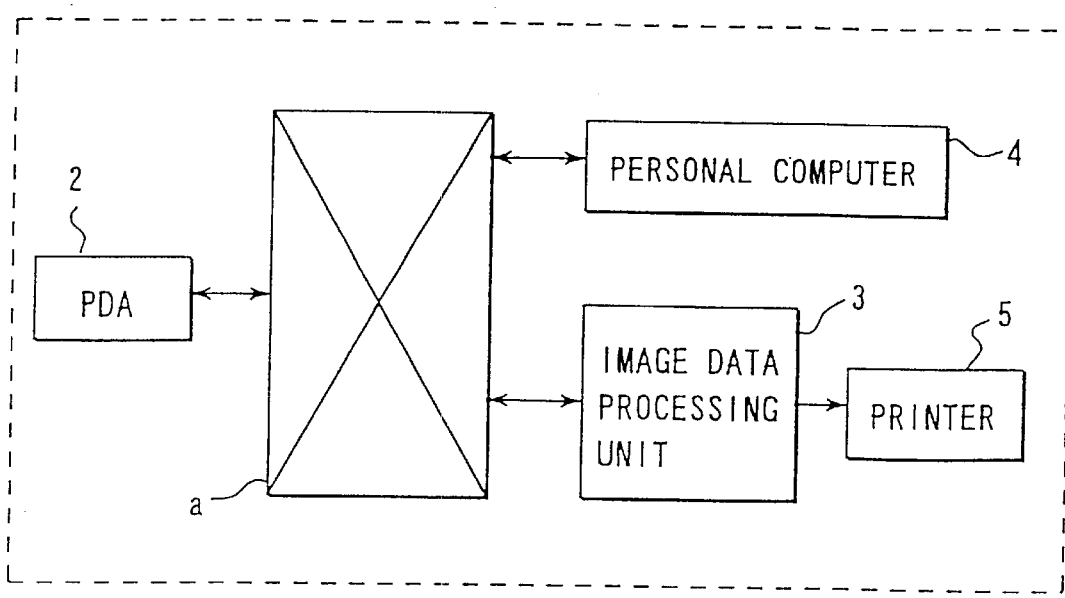
FIG. 1 is a system block diagram of an image data processing system according to an embodiment of this invention.

FIG. 1 is a system block diagram of an image data processing system according to an embodiment of this invention.

In FIG. 1, an image data processing system 1 is constructed by a PDA (Personal Digital Assistant) 2 used as a photographing unit, an image data processing unit 3 used as a center unit, a personal computer 4 used as a terminal unit and the like and the above portions are connected via a communication line a. Further, a printer 5 is connected to the image data processing unit 3.

Figure 2:
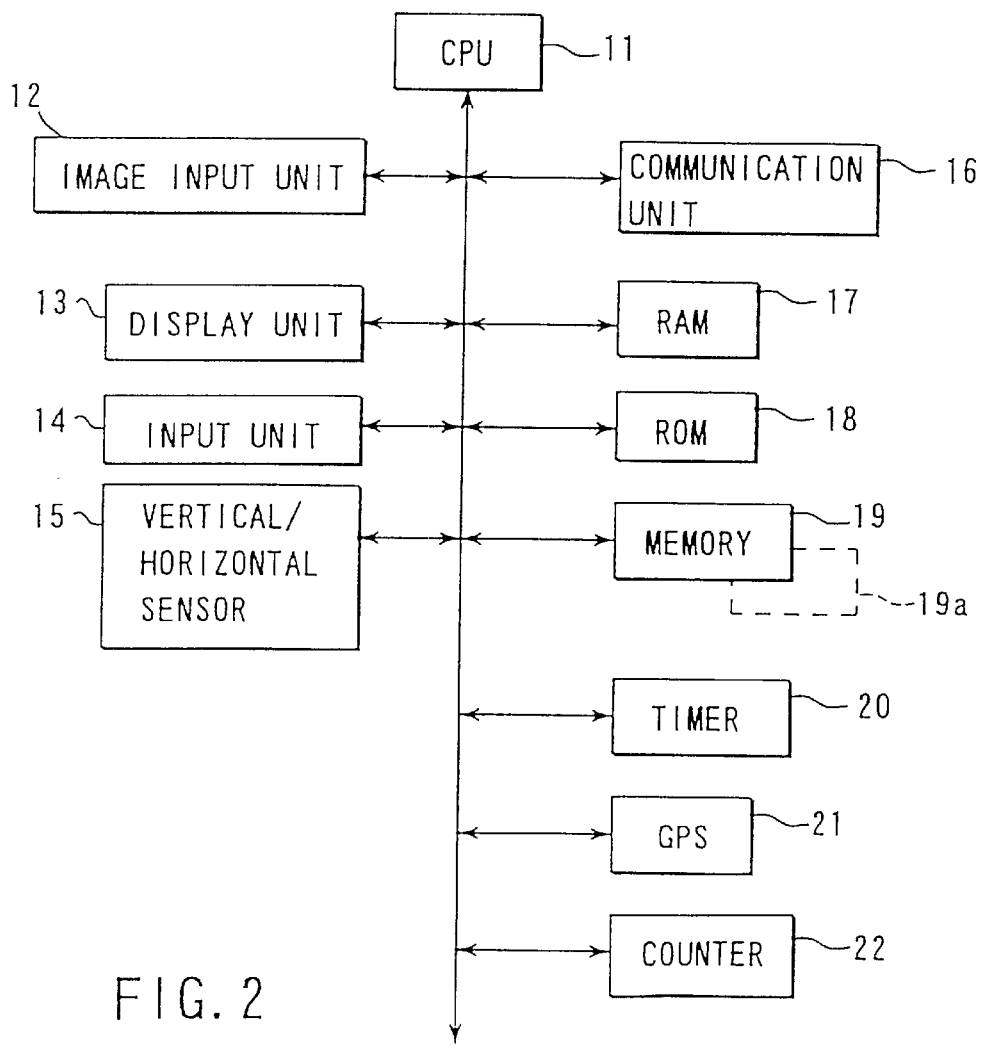
FIG. 2 is a block diagram showing the construction of a main portion of a PDA 2.
Figure 3:
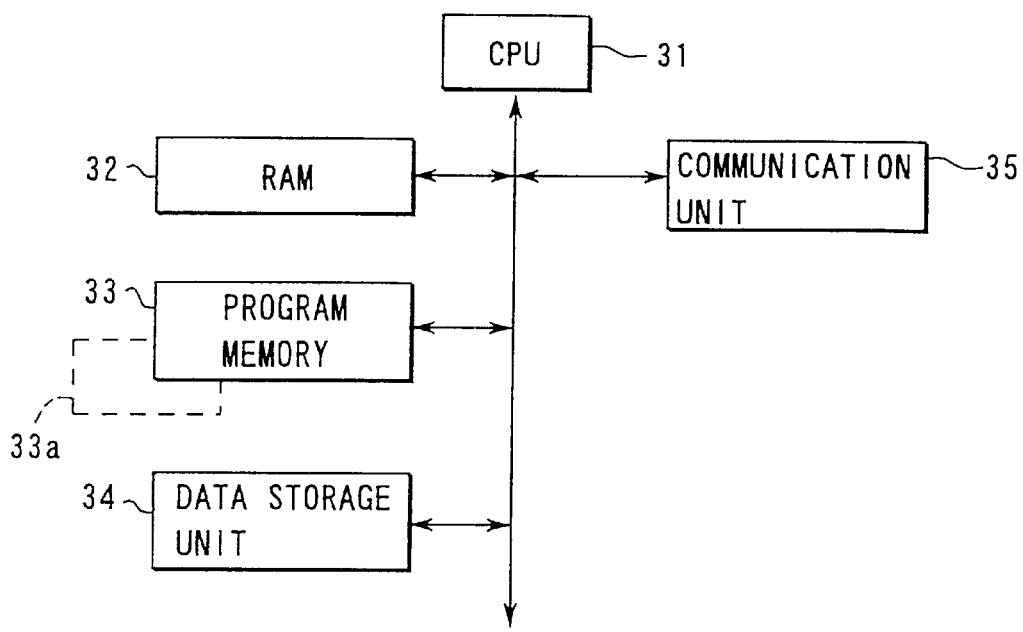
FIG. 3 is a block diagram showing the construction of a main portion of an image data processing unit 3.

FIGS. 2 and 3 are block diagrams respectively showing the constructions of the main portions of the PDA 2 and image data processing unit 3.

As shown in FIG. 2, the PDA 2 is constructed by a CPU (Central Processing Unit) 11, image input unit 12, display unit 13, input unit 14, vertical/horizontal sensor 15, communication unit 16, RAM (Random Access Memory) 17, ROM (Read Only Memory) 18, memory 19, timer 20, GPS (Global Positioning System) measuring unit 21, counter 22 and others and the above portions are connected via a bus 23.

The CPU 11 effects operation processes necessary for various operations corresponding to an input via the input unit 14 with respect to the RAM 17 according to various control programs stored in the ROM 18 and creates and outputs various control signals for controlling the respective portions of the PDA 2 based on the operation processes.

The image input unit 12 is constructed by a CCD (Charge Coupled Device), lens, A/D converter, driving circuit, timing generator and others although they are not shown in the drawing, and it receives light of the image of a subject formed by the lens in the CCD, stores charges of an amount proportional to the amount of received light in each of transfer electrodes arranged on the light receiving surface of the CCD and sequentially converts the stored charges stored in each of the transfer electrodes treated as an electrical signal (analog signal) into digital image data for each electrode in response to a driving signal supplied from the driving circuit in the A/D converter.

The display unit 13 is constructed by a liquid crystal display panel or the like to display an image based on photographed image data and display the content of a command input from the CPU 11 or a comment or title input via the input unit 14.

Although not shown in the drawing, the input unit 14 is a unit for outputting a depression signal to the CPU 11 when a key on a keyboard having a cursor key, numeral input keys, various function keys and the like is depressed and it is used to input a title and comment for image data and determine the output format. Further, the input unit 14 may be of a so-called tablet type which has a transparent position detecting tablet superposed on a liquid crystal display (not shown) and detects the XY coordinate of a pressurized point by contact of a finger tip based on a pressure-sensitive system and outputs the same to the CPU 11.

The vertical/horizontal sensor 15 is a sensor for detecting whether the photograph is taken with the PDA 2 set in the horizontal position or in the vertical position and the PDA 2 has a pendulum provided therein to detect the position based on the rotation of the pendulum.

The communication unit 16 has a function of executing the communication protocol for transmitting and receiving image data and the like with respect to the image data processing unit 3 or terminal unit 4 via the communication line a and has a terminal which can be connected to the communication line a.

The RAM 17 has a storage area for temporarily storing image data and the like and a work area for the CPU 11 and data can be rewritten according to the input via the input unit 14.

The ROM 18 stores various control programs (for example, part of the programs shown in the flowcharts of FIGS. 5 to 7, and FIGS. 9, 10) executed in the PDA 2 and data and the like used in the program processing.

The memory 19 is a unit for storing photographed image data. The memory 19 has a storage medium 19a in which programs, data and others are previously stored and the storage medium 19a is formed of a magnetic, optical storage medium or semiconductor memory. The storage medium 19a includes a medium fixedly provided in the memory 19 or a medium which can be removably mounted. The program, data and others to be stored in the storage medium 19a may be supplied from another device connected via the communication line and stored therein.

The timer 20 has a time counting function, counts the photographing time and outputs time data to the CPU 11.

The GPS (Global Positioning System) measuring unit 21 has a function of measuring a place at which the user took a photograph of image data, specifies the place at which the image data was photographed based on a difference between the arrival times of radio waves transmitted to a plurality of artificial satellites (for example, four or more satellites) from a control station on the ground and the arrival times of radio waves transmitted from the artificial satellites to the PDA 2 and outputs the coordinate data of the place, place name and others to the CPU 11.

Although not shown in the drawing, the counter 22 is constructed by a counter and the like, counts the number of photographs taken after preset photographing start time and outputs the obtained result to the CPU 11.

The PDA 2 transmits image data, data of time at which the image data was photographed, GPS data, vertical/horizontal data, number-of-images data, comment, title and a command signal of a desired output format to the image data processing unit 3 according to a transmission command by the user.

FIG. 3 is a block diagram showing the construction of the main portion of the image data processing unit 3 in the above embodiment to which this invention is applied.

The image data processing unit 3 shown in FIG. 3 has a CPU 31, RAM 32, program memory 33, data storage unit 34, communication unit 35 and others provided therein.

The CPU 31 fetches image data and related data (image data and the like) thereof stored in the data storage unit 34 and subjects the image data to the editing process, and stores the result of the process into the data storage unit 34 again or outputs the same to the printer 5 or the like according to various control programs stored in the program memory 33.

The RAM 32 forms a work area used for the image data editing process executed by the CPU 31.

The program memory 33 has a storage medium 33a in which a program (for example, a program shown in FIG. 8), data and others are previously stored and the storage medium is formed of a magnetic, optical storage medium or semiconductor memory. The storage medium 33a includes a medium fixedly provided in the memory 19 or a medium which can be removably mounted. Further, in order to obtain the program, data and others stored in the storage medium 33a, it is possible to provide a memory having the above storage medium on another device side connected via the communication line a and use the program and data stored in the storage medium 33a via the communication line a.

Figures 11, 12:
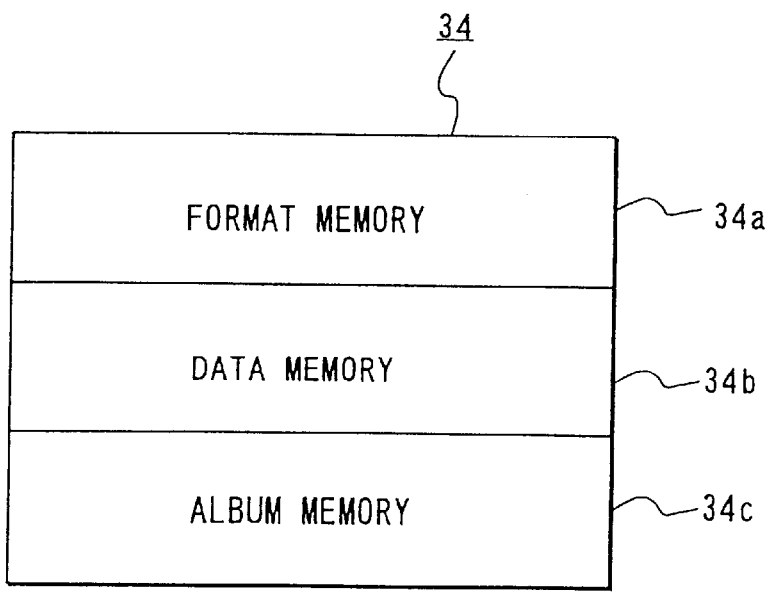
FIG. 11 is a diagram showing the memory configuration of a data storage unit 34 of the image data processing unit 3.
FIG. 12 is a diagram showing the data memory configuration of the data storage unit 34 of the image data processing unit 3.

The data storage unit 34 is constructed by a format memory 34a, data memory 34b, album memory 34c and others as shown in FIG. 11 and image data and data related to the image data transmitted from the PDA 2 or image data obtained after editing and data related to the image data are stored therein.

The communication unit 35 is connected to the PDA 2 or personal computer 4 via the communication line a (for example, telephone line) and has a communicating function of executing the communication protocol for transmitting and receiving image data and the like via the communication line a.

The image data processing unit 3 receives image data received from the PDA 2 and data related thereto or a command signal of output format at the communication unit 35 and stores the received image data and the like in the data storage unit 34. Then, it fetches image data and the like from the data storage unit 34 via the CPU 31 based on the command signal of output format, subjects the image data and the like to the editing process, and outputs the result of the process to the personal computer 4 or printer 5. Further, the image data processing unit 3 receives image data reedited in the personal computer 4 and image data-related information and stores them into the data storage unit 34.

Figure 4:
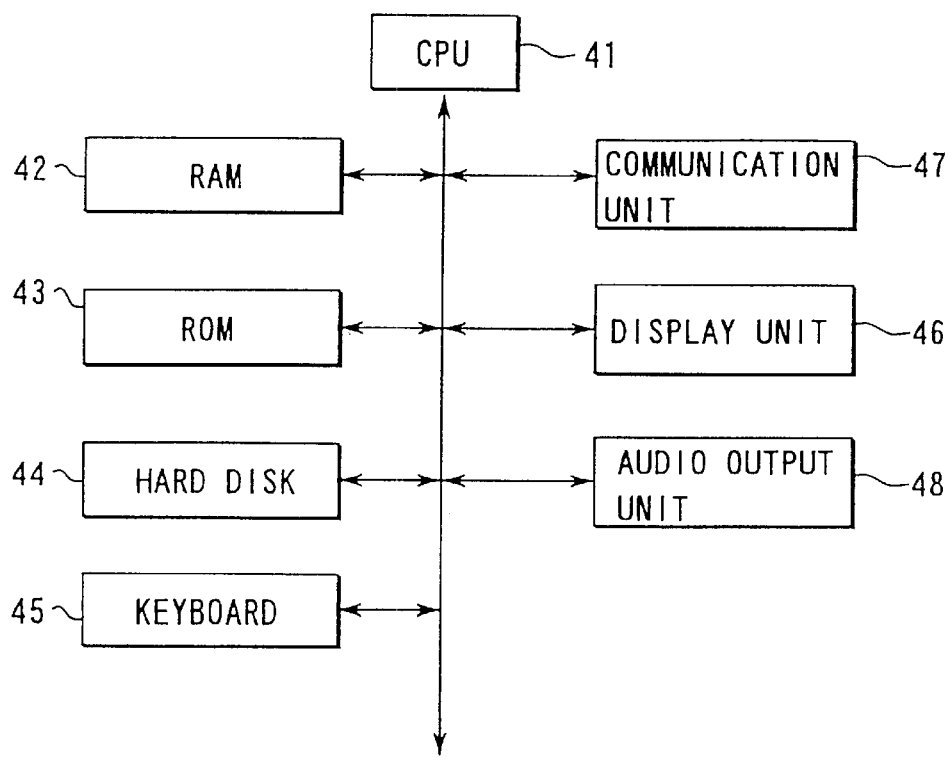
FIG. 4 is a block diagram showing the construction of a main portion of a personal computer 4.

FIG. 4 is a block diagram showing the construction of the main portion of the personal computer 4 in the above embodiment to which this invention is applied.

The personal computer 4 shown in FIG. 4 is constructed by a CPU 41, RAM 42, ROM 43, hard disk 44, keyboard 45, display unit 46, communication unit 47, audio output unit 48 and others.

The CPU 41 fetches image data and image data-related information stored in the hard disk 44, subjects them to the image data editing process, and stores the result of the process into the hard disk 44 again or outputs the same to the image data processing unit 3 according to various control programs stored in the ROM 43. Further, the CPU 41 also effects the control operation to convert the image data-related information into an audio signal.

The RAM 42 forms a work area for the image data editing process effected by the CPU 41.

Various control programs necessary for editing image data are stored in the ROM 43.

In the hard disk 44, image data transmitted from the PDA 2 and data related to the image data, or image data obtained after editing and data related to the image data are stored.

Although not shown in the drawing, the keyboard 45 is a unit for outputting a depression signal to the CPU 41 when a key on a keyboard having a cursor key, numeral input keys, various function keys and the like is depressed and it is used to input a title and comment for image data and determine the output format.

The display unit 46 is constructed by a CRT (Cathode Ray Tube) or the like and displays an image display signal input via the CPU 41 in a specified color.

The communication unit 47 is connected to the PDA 2 or image data processing unit 3 via the communication line a (for example, telephone line) and has a communicating function of executing the communication protocol for transmitting or receiving image data via the communication line a.

The audio output unit 48 is constructed by a speaker which is not shown or the like and outputs image data-related information which is converted into an audio output as a voice.

The personal computer 4 fetches image data edited in the image data processing unit 3 or the like via the communication line a by use of the communication unit 47, displays the fetched image data and the like on the display screen of the display unit 46, reedits the image data and the like and outputs the image data to the image data processing unit 3 again. At this time, the output format can also be determined.

The printer 5 is connected to the image data processing unit 3 and outputs the edited image data and the like in a preset format.

Next, the operation is explained.

Figures 5, 6:
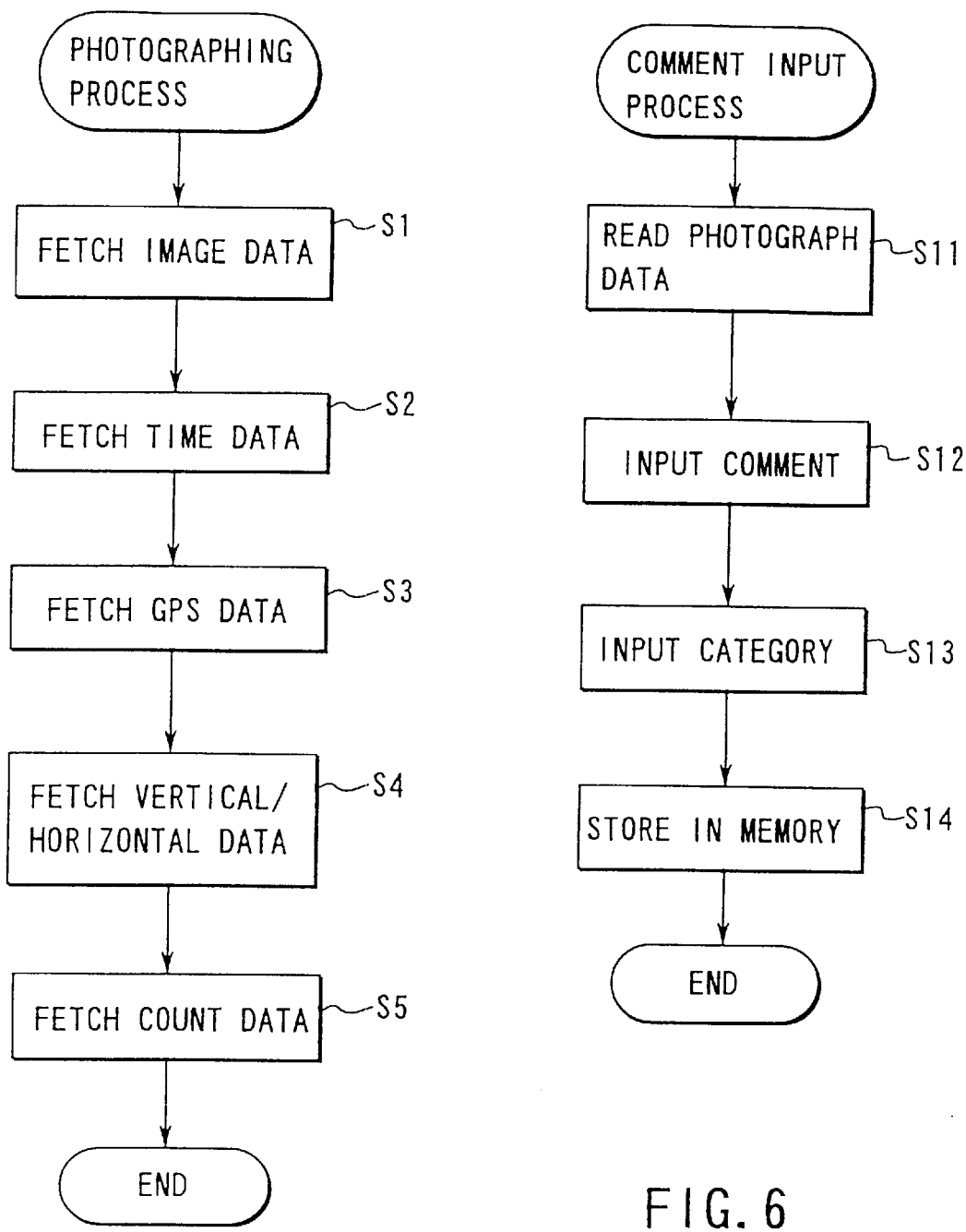
FIG. 5 is a flowchart showing the content of a process for photographing a subject in the PDA 2.
FIG. 6 is a flowchart showing the content of a comment input process in the PDA 2.

FIG. 5 is a flowchart showing the content of a process for photographing a subject in the PDA 2.

When a key of the input unit 14 which corresponds to the shutter release of a camera is depressed, the photographing process is started. In the step S1, image data of a photographed subject is created in the image input unit 12 and the image data is stored into the memory 19.

In the step S2, a process for reading the time at the image data creation time from the timer 20 and storing the time data into the memory 19 is effected.

In the step S3, the measuring place (the coordinate indicating the north latitude and the east longitude) at the image data creation time is read from the GPS measuring unit 21 and the GPS data is stored into the memory 19.

In the step S4, information that the photographed image data is a vertical type or horizontal type is read from the vertical/horizontal sensor 15 and the vertical/horizontal data is stored into the memory 19.

In the step S5, the number of the photographed image data counted from the preset photographing start time is read from the counter 22 and the number-of-images data is stored in the memory 19, and then the present photographing process is completed.

FIG. 6 is a flowchart showing the content of the comment input process in the PDA 2.

In the comment input process, a process for reading out photographed image data from the memory 19 is effected in the step S11.

In the step S12, a comment for the fetched image data is input by use of a keyboard (not shown) of the input unit 14.

In the step S13, a category (for example, which is used for grouping the same type of data) according to the user's request for the fetched image data.

In the step S14, a process for storing the input comment and category in correspondence to the readout image data into the memory 19 is effected and the present comment input process is terminated.

Figure 7:
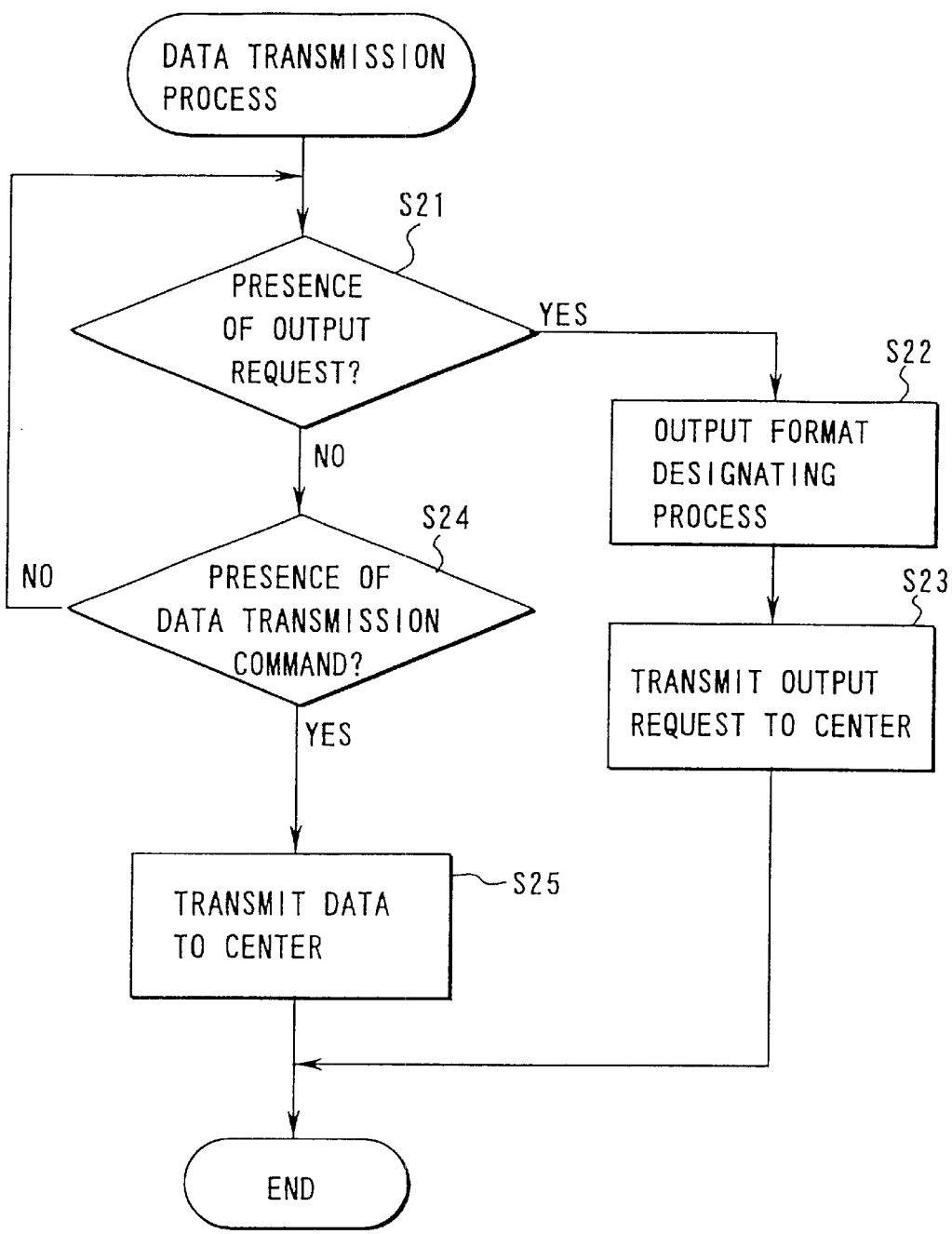
FIG. 7 is a flowchart showing the content of a data transmission process for transmitting data from the PDA 2 to the image data processing unit 3.

FIG. 7 is a flowchart showing the content of a data transmission process for transmitting data from the PDA 2 to the image data processing unit 3.

The PDA 2 can transmit a photographed image and transmit an output request of the image to the image data processing unit. In the data transmission process, whether an output request for requesting the image data processing unit 3 to output data is present or not is determined in the step S21, and if it is detected as the result of the above determination that the output request is present, an output request signal is transmitted (step S23) from the communication unit 16 of the PDA 2 to the communication unit 35 of the image data processing unit 3 after the output format designating process (step S22) is effected, and then the present data transmission process is terminated, and if it is detected as the result of the above determination in the step S21 that no output request is present, the step S24 is effected.

In the step S24, whether a data transmission command is present or not is determined, and if it is detected as the result of the above determination that no data transmission command is present, the present process is returned to the step S21 and is repeated, and if the data transmission command is present, a process for transmitting image data specified to be transmitted and related data thereof from the communication unit 16 of the PDA 2 to the communication unit 35 of the image data processing unit 3 is effected and the present data transmission process is terminated.

In this case, the output format designating process effected in the step S22 is a process for designating a way of printing the image received by and stored in the image data processing unit 3. More specifically, the output format can be previously selectively set in the time unit, place unit, vertical/horizontal unit, category unit, number-of-images unit, that is, the output selection can be made in the unit of related data of the image data and the output format can be determined by selecting one of them by the user's operation. The arrangement of an image with album size shown in FIG. 13 as will be described later is determined by designation of the output format.

Figure 8:
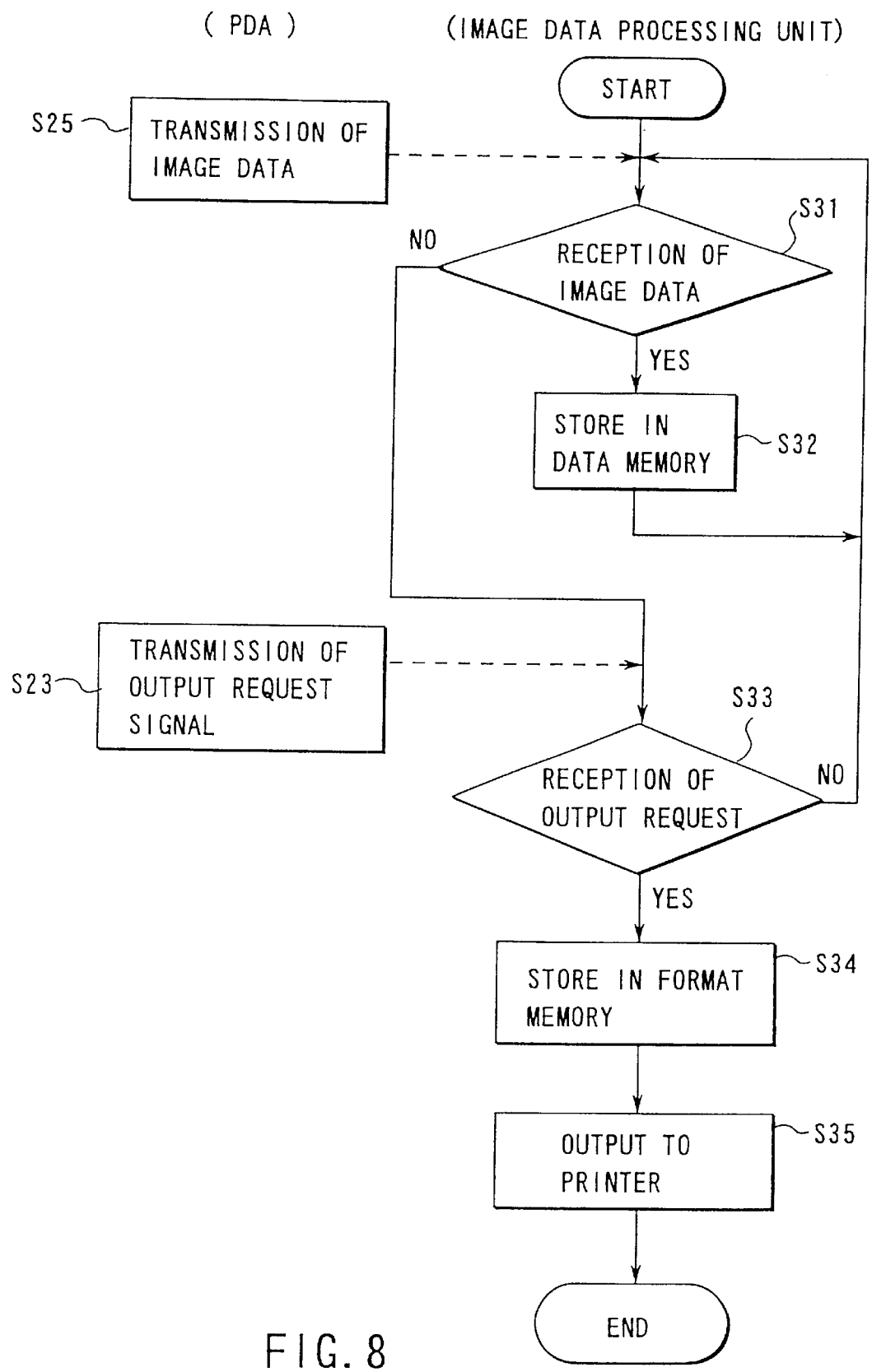
FIG. 8 is a flowchart showing the content of an image data process in the image data processing unit 3.

Next, an image data processing on the center side effected in the image data processing unit 3 based on an output request signal or image data and the like output from the PDA 2 is explained with reference to the flowchart of FIG. 8. A program for realizing various functions of the center described in the flowchart is stored in the storage medium 33a in the form of program code which can be read out by the CPU 31.

Figure 13A:
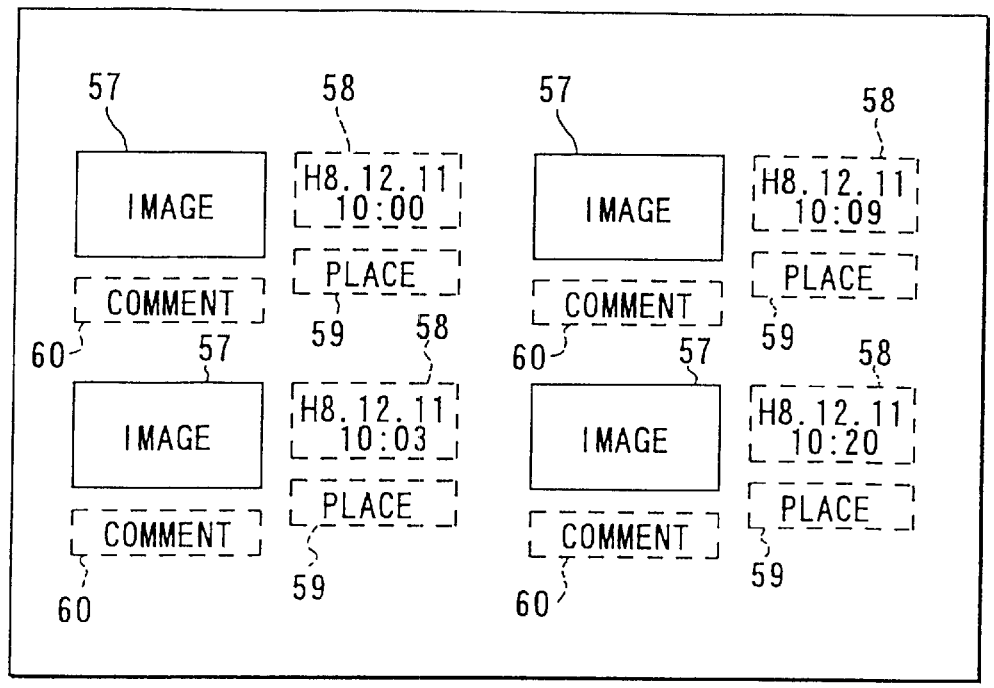
FIGS. 13A and 13B are diagrams schematically showing one format of output result of image data and the like by an image data processing system 1.
Figure 13B:
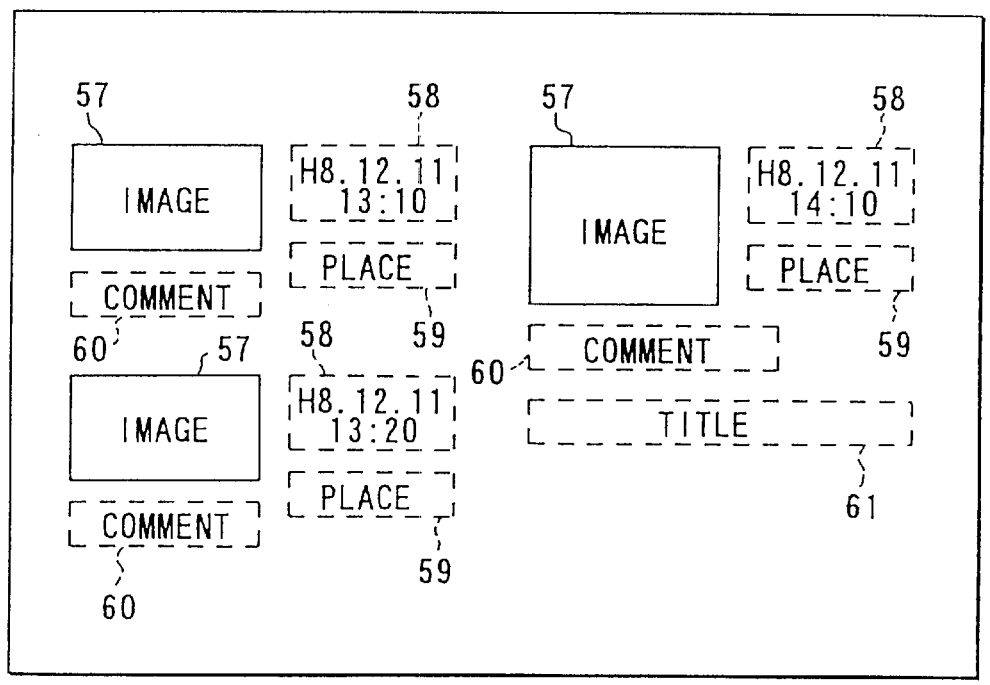

In the image data processing unit 3, first, whether image data and related data thereof transmitted from the PDA 2 in the step S25 of FIG. 7 are received by the communication unit 35 or not is determined in the step S31. If it is detected as the result of the above determination that the image data and related data thereof are received, the step S32 is effected to store the image data and related data thereof in the data memory 34b (for example, related data (time 51, place 52, comment 53, number of images 54, category 55) is stored in correspondence to image data 50 as shown in FIG. 12). If it is determined in the step S31 that no image data or the like is received, the step S33 is effected to determine whether an output request signal in the step S23 is received by the communication unit 35 or not. If the output request signal is received, the output format designated in the step S34 is stored in the format memory 34a and a printout (for example, the output result as shown in FIGS. 13A and 13B) is issued from the printer 5 in the step S35 to terminate the process. Further, if the output request is not received, the step S31 is effected again and the process is repeated.

Figure 9:
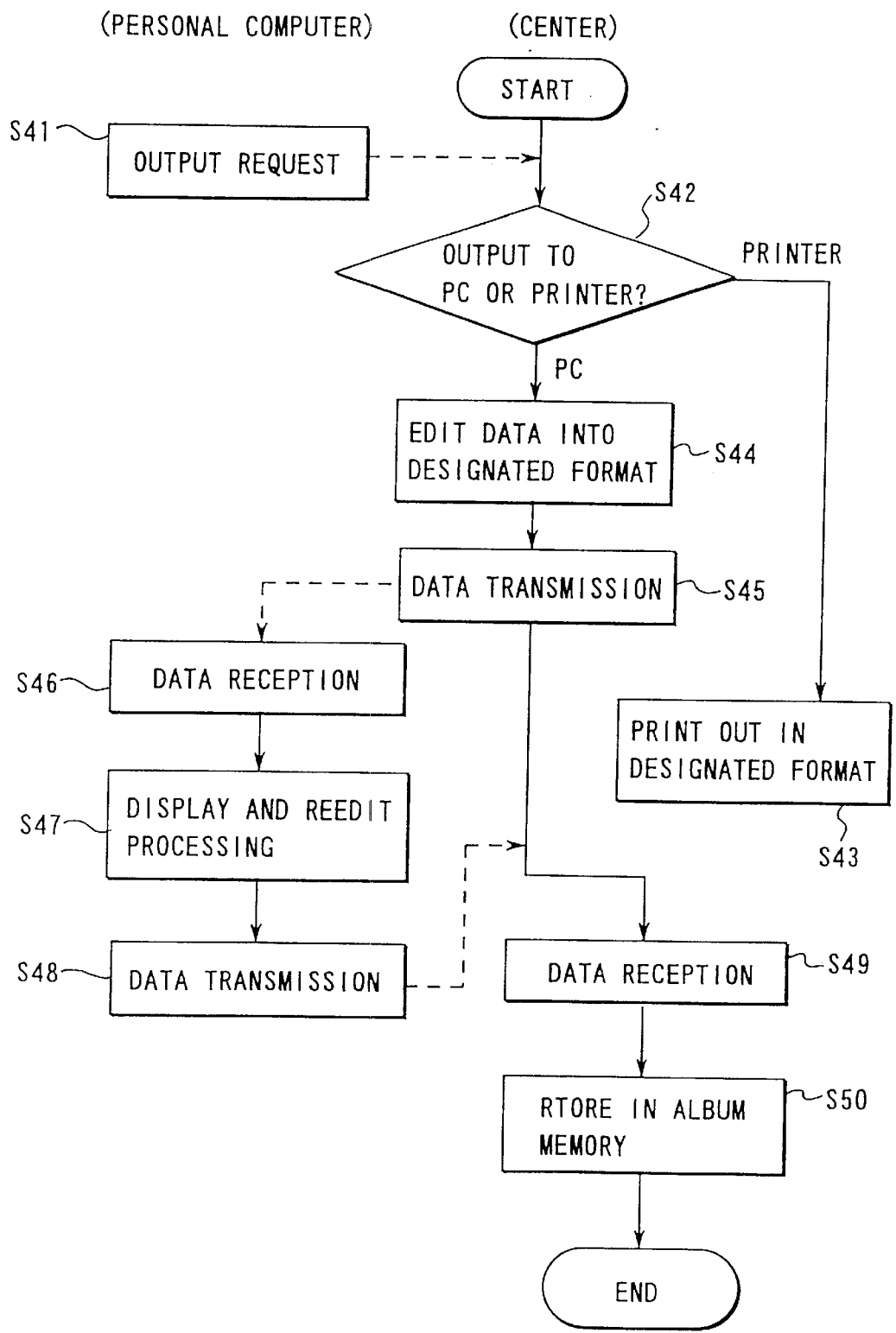
FIG. 9 is a flowchart showing the contents of communication and editing processes for image data and the like effected by the personal computer 4 and image data processing unit 3.

Next, the flow of the process for communicating and editing image data and the like effected between the personal computer 4 and the image data processing unit 3 of the center is explained with reference to FIG. 9.

The personal computer 4 can designate an output destination and issue an output request for outputting an image with respect to the center. First, if an output request of image data and the like is transmitted (step S41) from the personal computer 4 to the image data processing unit 3, the image data processing unit 3 determines in the step S42 whether the output request is issued for an output to the personal computer 4 or an output to the printer 5. If an output to the printer 5 is determined as the result of the above determination, the step S43 is effected to output the image data and the like in the designated format. On the other hand, in the case of an output to the PC 4, the image data and the like are edited in the designated output format (step S44) and the edited image data and the like are transmitted from the communication unit 35 to the communication unit 47 of the personal computer 4 (step S45).

In the personal computer 4, image data and the like transmitted from the image data processing unit 3 of the center is received in the step S46 and the received image data and the like are displayed on the display unit 46. On the display screen, the user effects the reediting process (step S47) such as removal of an unnecessary photograph by use of the keyboard 45. At this time, a process for converting text data into a voice can be specified, and if the specification is made, text data is converted into voice data and an acoustic icon is attached to the image instead of display of the text.

In the step S48, a process for transmitting the reedited image data and the like to the image data processing unit 3 is effected.

In the step S49, the image data processing unit 3 receives the reedited image data and the like transmitted from the personal computer 4 at the communication unit 35, effects a process for storing the received reedited image data and the like into the album memory 34c in the data storage unit 34 (step S50) and the present image data communicating and editing process is terminated.

Figure 10:
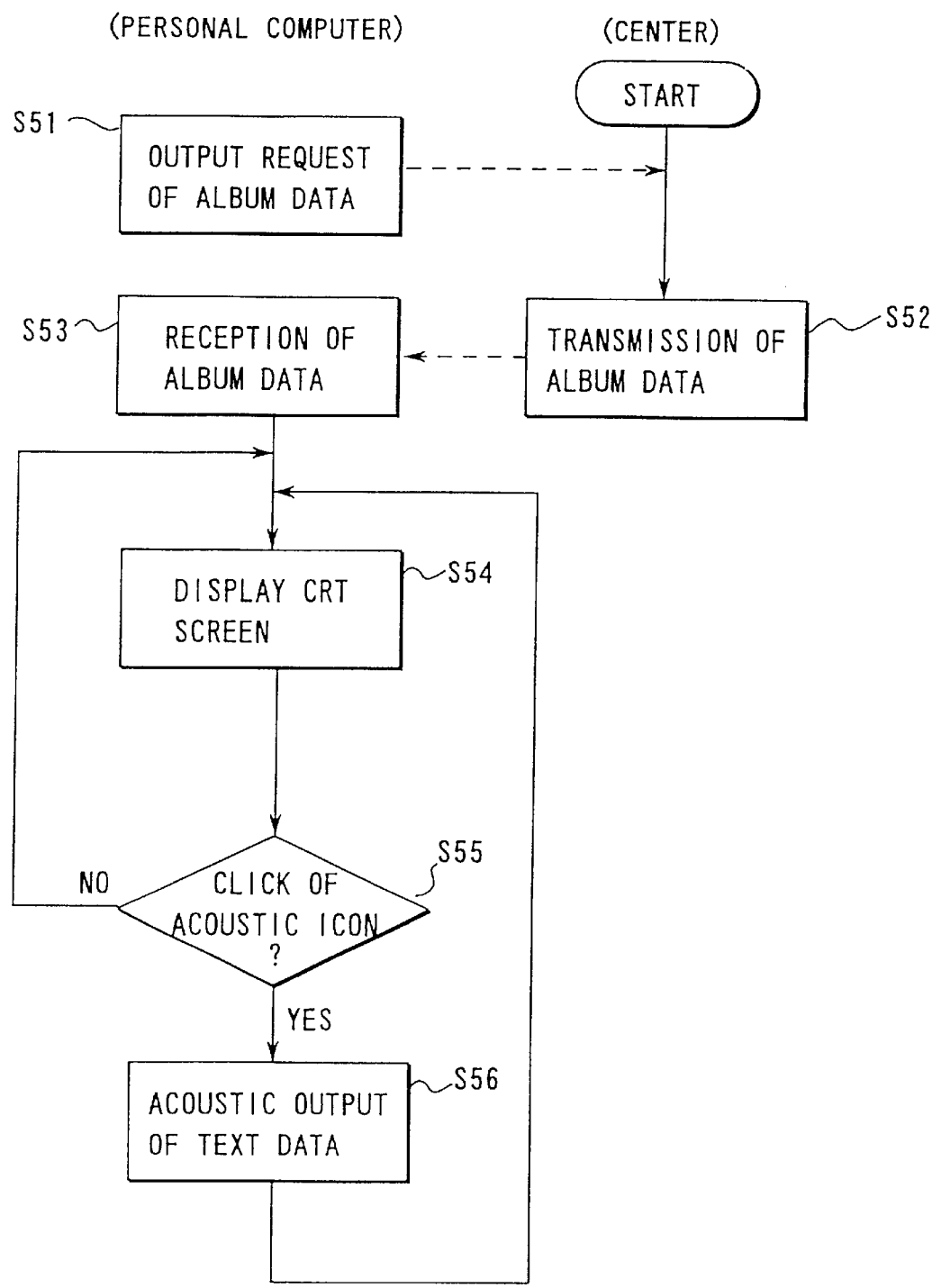
FIG. 10 is a flowchart showing the content of an album data communication processes effected by the personal computer 4 and image data processing unit 3.

Next, the processing flow of the album data communicating process effected by the image data processing unit 3 of the center and the personal computer 4 is explained with reference to FIG. 10.

If an output request for album data or the like stored in the album memory 334c of the data storage unit 34 is transmitted from the personal computer 4 to the image data processing unit 3 (step S51), the image data processing unit 3 reads out album data stored in the album memory 34c and transmits the same to the personal computer 4 via the communication unit 35 in the step S52.

The personal computer 4 receives the album data transmitted from the image data processing unit 3 at the communication unit 47 in the step S52 and displays the received album data on the display unit 46 (for example, on the CRT screen) (step S54). In the step S55, whether the acoustic icon on the display screen of the displayed album data is specified or not is determined, and if it is detected as the result of the above determination that the acoustic icon is not specified, the step S54 is effected to repeatedly display the data, and if the acoustic icon is specified, text data is converted into a voice and output by the audio output unit 48 in the step S56.

Since the image data processing system 1 described above is formed with the above construction, the following image data processing can be attained, for example.

First, the user who makes a journey with the PDA 2 takes photographs of scenery, person, or the like on the journey. Thus, photograph data is created in the image input unit 12, and at the same time, photographing time is determined by the timer 20, the photographing place is determined by the GPS measuring unit 21, whether the photograph is taken in the vertical position or in the horizontal position is determined by the vertical/horizontal sensor 15, the number of the photographed image data counted from the preset photographing start time is determined by the counter 22, and the image data and the related data thereof are stored in the memory 19.

Then, the user fetches each photographed image data from the memory 19, displays the same on the display unit 13 and inputs a comment or title for the image data via the input unit 14. At this time, the user inputs a category to categorize scenery images and person images. Then, the image data and the related data thereof are transmitted to the communication unit 35 of a center having the image data processing unit 3 and existing near the user's home via the communication line a by use of the communication unit 16.

The image data processing unit 3 of the center stores the received image data and related data thereof in the data storage unit 34.

Then, the user inputs an output request for printing of images and the like based on the image data and related data thereof in time-sequential order, for example, via the input unit 14 and transmits the output request signal to the image data processing unit 3 of the center on the final day of the journey.

The image data processing unit 3 of the center outputs an album of images and the like based on the image data and the related data thereof to the printer 5 thereof according to the received output request signal. More specifically, as shown in FIG. 13B, images (photographs) 57 are printed together with time 58, place 59, comment 60, title 61 and the like in time-sequential order as an album.

Then, the user will drop in the center on the way back home from the journey and take an output album home.

Therefore, the image data and the like created in the PDA 2 (photographing unit) can be edited according to the output format which the user desires and output in the preset output format and the added value of the photographed image data can be fully utilized while the output format is not influenced by the function of the personal computer 4 (terminal unit) of the user, unlike as in the conventional case.

Further, since an output in the desired output format can be attained by previously transmitting photographed image data and the like to a center near the user's home, it becomes unnecessary for the user to edit the image data and the like by himself, and the user can immediately see the output result.

In this case, the personal computer at the user's home and the image data processing unit 3 are connected to each other via the communication line a.

Therefore, the user can fetch the image data and image data-related information edited in the image data processing unit 3 into the personal computer 4 and perform the reediting process such as removal of unnecessary image data, re-arrangement, or addition or modification of the comment or title so as to edit the photographed image data to his satisfaction.

In this case, image data and image data-related information subjected to the reediting process can be transmitted to the image data processing unit 3 again and output from the printer 5.

Therefore, the user can determine the output format by use of either the photographing unit or the terminal unit and it becomes a further convenient image data processing system.

Further, in this case, text information such as the comment and title can be specified to be output as a voice by the personal computer 4.

Therefore, when an electronic album is reproduced by use of a personal computer or the like, text information can be output as a voice and the image data editing with larger added value can be attained.

Next, another embodiment of this invention is explained with reference to FIGS. 14 to 22C.

Figure 14:
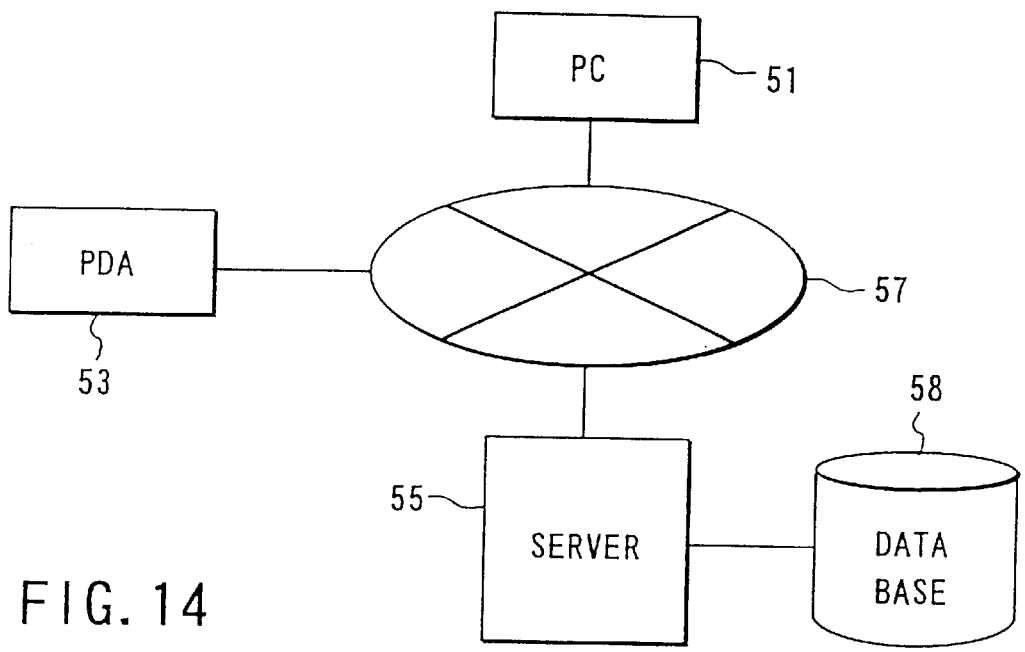
FIG. 14 is a system block diagram of an image processing unit according to another embodiment of this invention.

FIG. 14 is a system block diagram of an image processing unit according to another embodiment of this invention. In FIG. 14, a personal computer (which is hereinafter referred to as a PC) 51, portable terminal unit (which is hereinafter referred to as a PDA) 53 and server 55 are connected to one another via a communication network 57. A data base 59 is connected to the server 55. The data base 59 stores position information (physical information such as a geographical coordinate) and information (social information such as a place name) related to the position.

Figure 15:
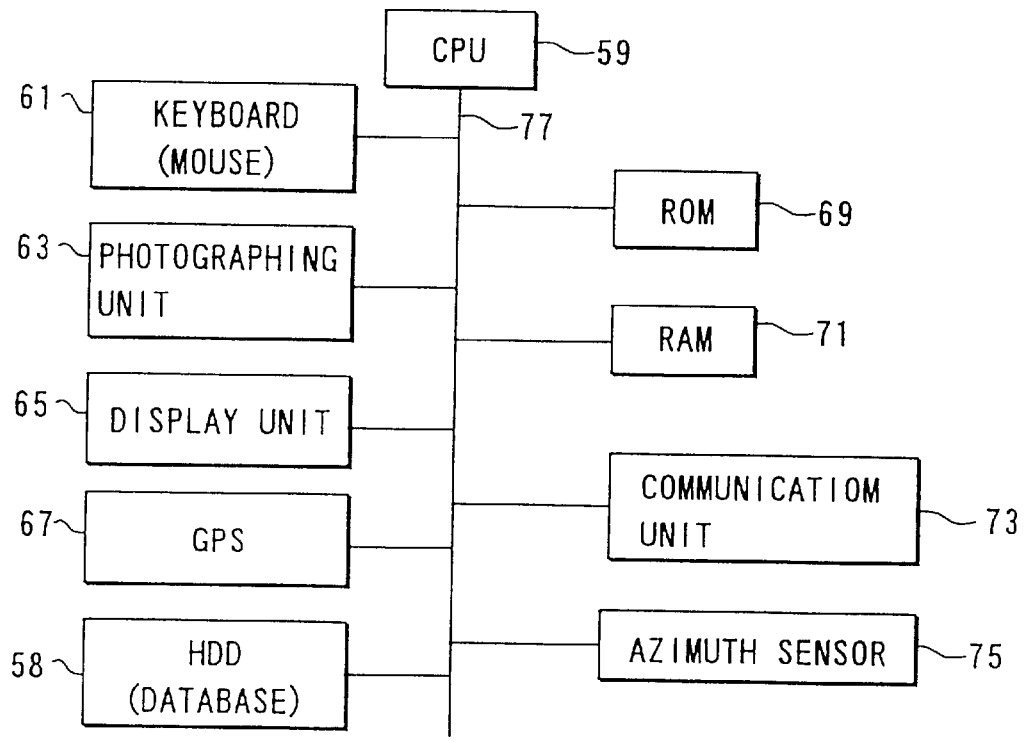
FIG. 15 is a system block diagram showing a PDA shown in FIG. 14.

FIG. 15 is a system block diagram of the PDA 53 shown in FIG. 14. As shown in FIG. 15, the PDA 53 is constructed by a CPU 59, keyboard 61, photographing unit 63, display unit 65, GPS 67, ROM 69, RAM 71, communication unit 73, and azimuth sensor 75 and the above units are connected to one another via a system bus 77. Since the CPU 59, keyboard 61, photographing unit 63, display unit 65, GPS 67, ROM 69, RAM 71 and communication unit 73 among the above units have constructions equivalent to those of the CPU 11, input unit 14, image input unit 12, display unit 13, GPS 21, ROM 18, RAM 71 and communication unit 73, the explanation therefor is omitted. The azimuth sensor 75 measures the azimuth when photographing is made by use of the photographing unit 63 (that is, a direction in which photographing is made).

FIG. 16 shows the memory configuration in the server 55. The memory configuration shown in FIG. 16 has areas for storing information of azimuth and other information in addition to the memory configuration shown in FIG. 12. As the information of azimuth, information of azimuth measured by the azimuth sensor 75 of the PDA 53 is stored. Further, as the other information, for example, an electronic mail address of a person whom the user came to know on the journey is stored by transmitting the electronic mail address from the PDA 53 to the server 55 after the user photographed him and heard his electronic mail address. As a result, the photographed image can be transmitted later to the electronic mail address.

Figures 17, 18, 19:
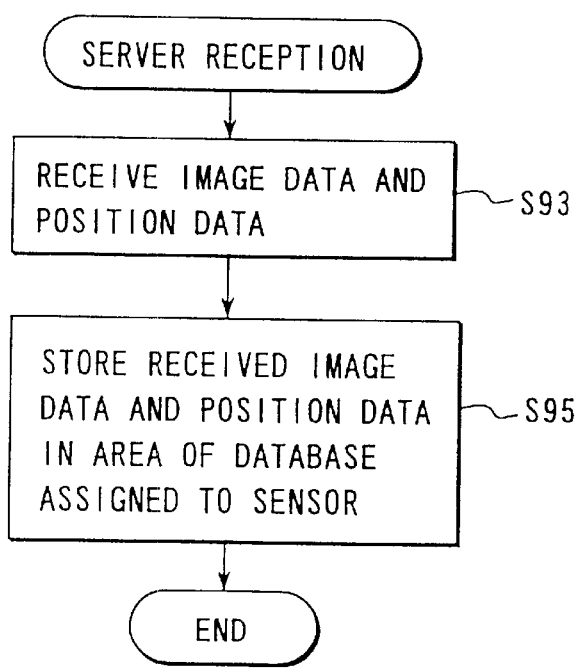
FIGS. 17 and 18 are diagrams showing the internal configuration of a data base shown in FIG. 14.
FIG. 19 is a flowchart showing the reception process of the server in the above embodiment of this invention.

FIGS. 17 and 18 are diagrams showing the internal configuration of the data base 58 shown in FIG. 14. The first data base shown in FIG. 17 previously stores position information (information of coordinates measured by the GPS 67) 83 and place name information (such as the names of noted sightseeing resorts) 85 corresponding to the position information. The second data base shown in FIG. 18 has position information (information of coordinates measured by the GPS 67) 87, azimuth information and geographical information 91 corresponding to the azimuth. For example, the place names of respective places existing on the north side, south side, west side and east side of a certain position coordinate (indicating the north latitude and the east longitude) are previously stored.

FIG. 19 is a flowchart showing the reception process of the server. The server 55 receives image data and position data from the PDA 53 via the communication network 57 in the step S93. Then, it stores the received image information and position information into a specified area in the data base 58 assigned to the sender in the step S95.

Figure 20:
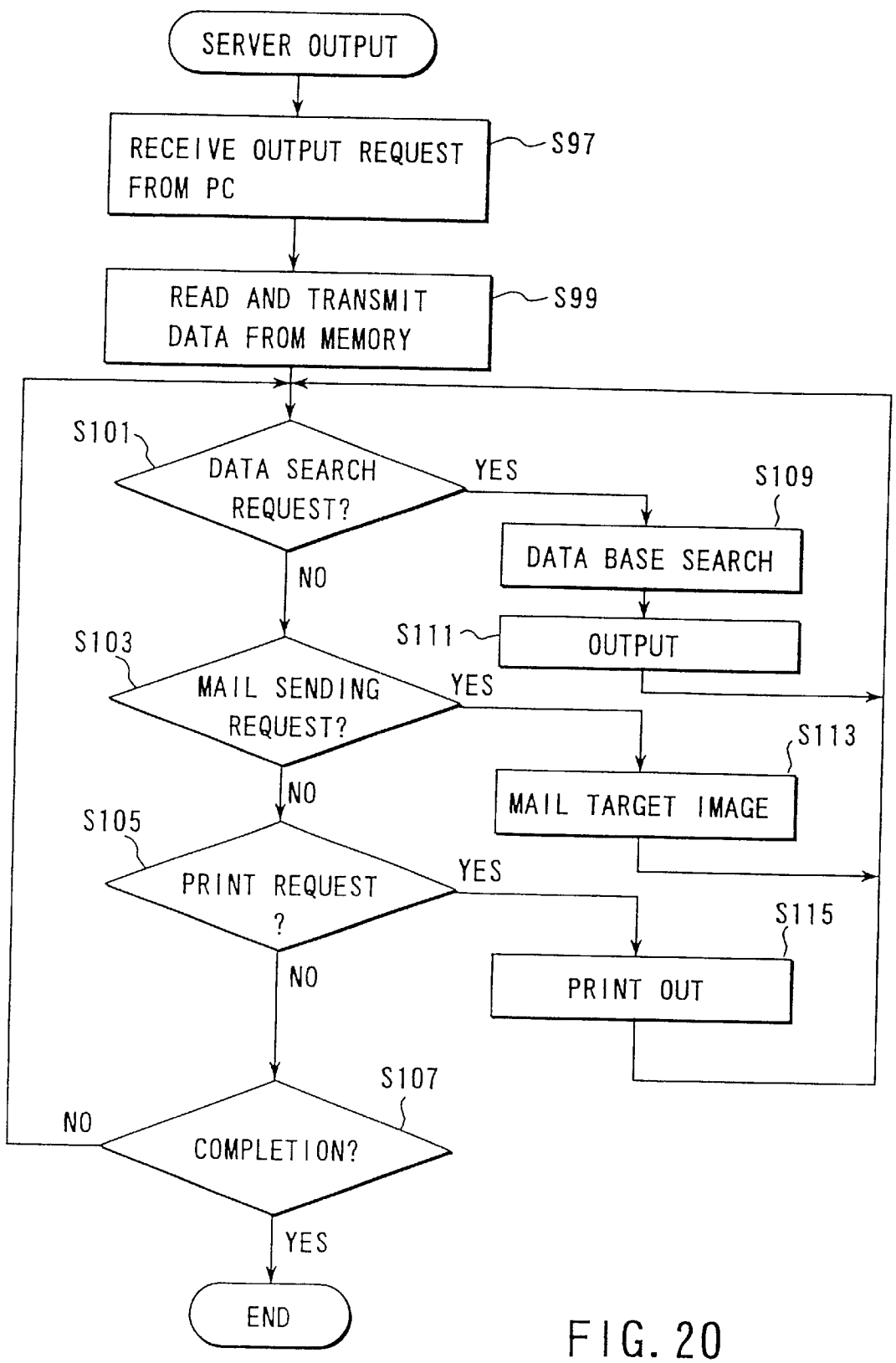
FIG. 20 is a flowchart showing the content of a process which the server executes in response to various requests from the PC in the above embodiment of this invention.
Figure 21:
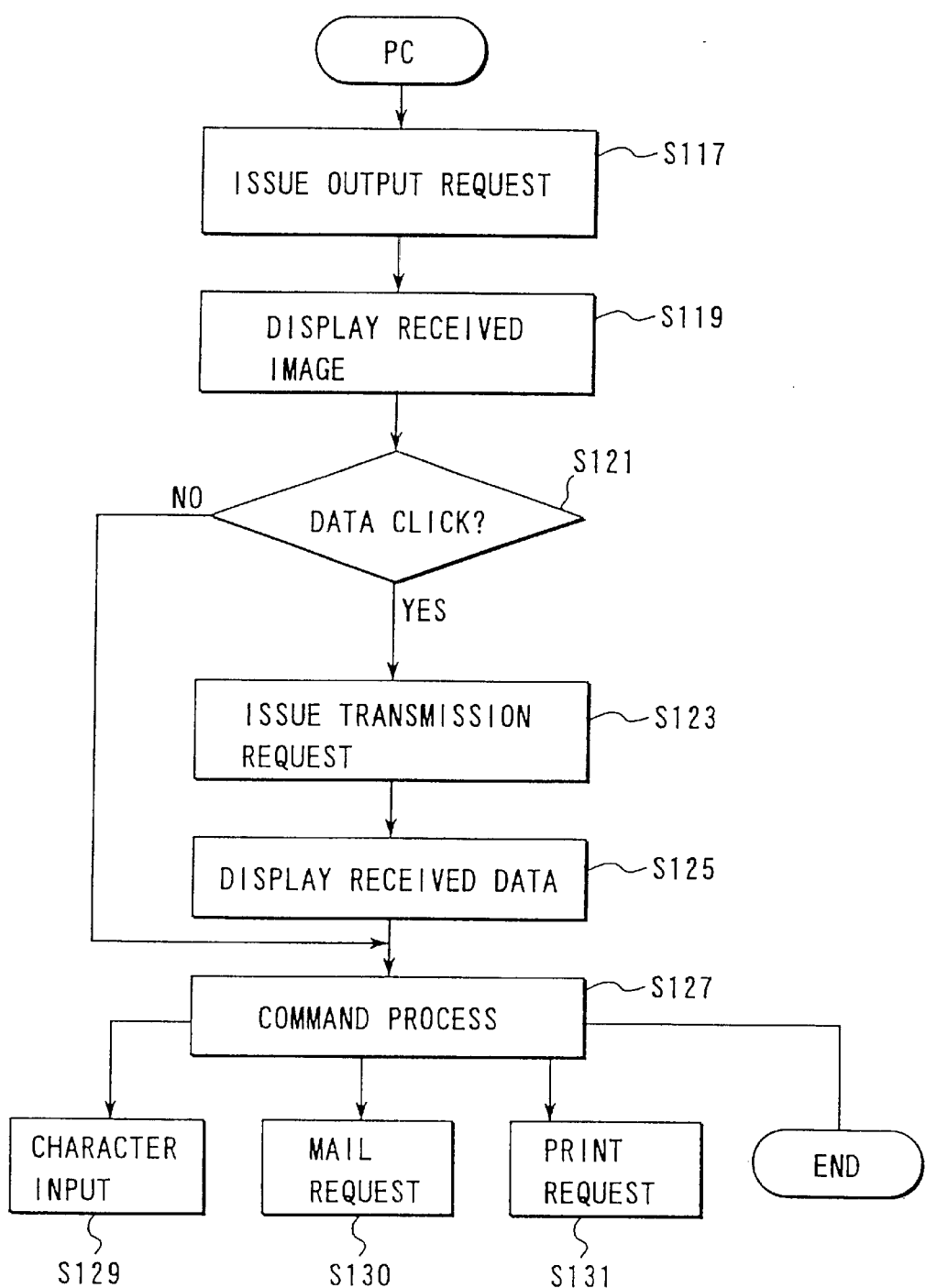
FIG. 21 is a flowchart showing a process effected when the PC issues various requests to the server in the above embodiment of this invention.
Figure 22A:
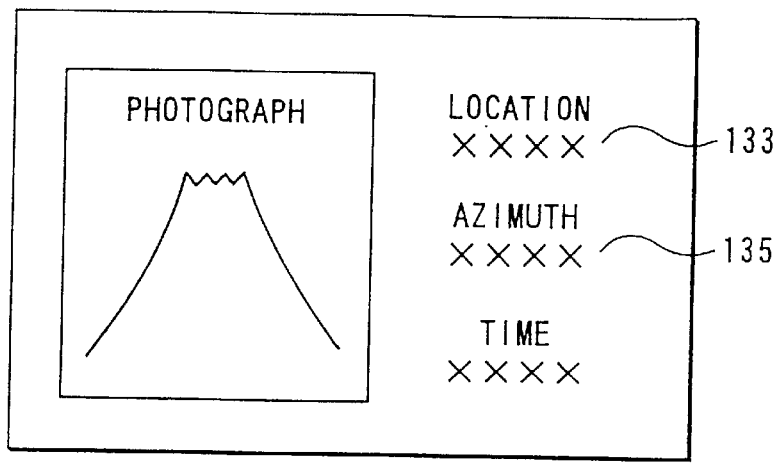
FIGS. 22A to 22C are diagrams showing screen display examples of image data and related information thereof in the PC.

FIG. 20 is a flowchart showing the content of a process which the server 55 executes in response to various requests from the PC 51 and FIG. 21 is a flowchart showing a process effected when the PC 51 issues various requests to the server 55. In the step S117 of FIG. 21, the PC 51 transmits an output request of desired image data to the server 55 via the communication network 57. The server 55 receives the image output request from the PC 51 in the step S97 of FIG. 20. Then, in the step S99, it reads out specified image data and related information (FIG. 16) thereof among the stored image data from a specified area of the data base 58 which is assigned to the user in response to the output request and transmits the same to the PC 51. The PC 51 displays the image data and related information thereof transmitted from the server 55 on the display unit 65 as shown in FIG. 22A in the step S119 of FIG. 21. The user can specify further related information (geographical information) of the image data displayed on the display unit 65 in the step S121. For example, in a case the user wants to know the name of a sightseeing resort in a corresponding place based on position information measured by the GPS 67, the user moves the cursor to a position corresponding to a position information field (133 in FIG. 22A) thereof and clicks the mouse 61. Alternatively, if the user wants to know the name of a place at which the photograph was taken based on the azimuth measured by the azimuth sensor 75, the user moves the cursor to a position corresponding to an azimuth field 135 shown in FIG. 22A and clicks the mouse. As a result, the PC 51 transmits the clicked position information and azimuth information to the server 55 in the step S123. The server 55 determines the content of the request from the PC 51 in the step S101 of FIG. 20, searches the data base 58 to read out specified information (a place name corresponding to the position information or a place name corresponding to the azimuth information) in the step S109, and outputs the information to the PC 51 in the step S111.

Figure 22B:
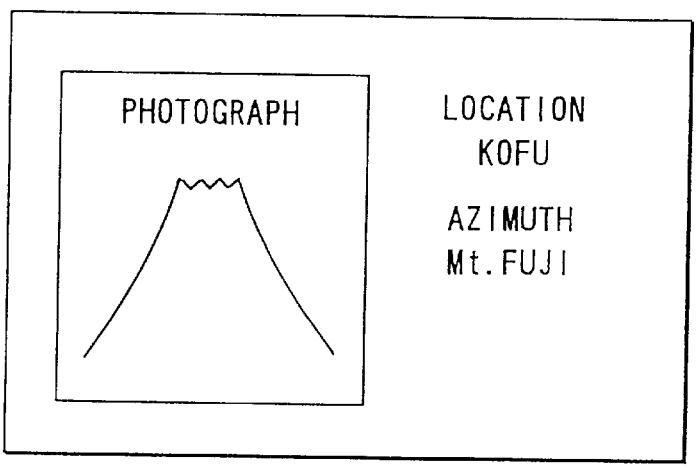

The PC 51 receives place name information corresponding to the position information and azimuth information from the server 55 and displays "KOFU" and "Mt. FUJI" as shown in FIG. 22B in the step S125.

Figure 22C:
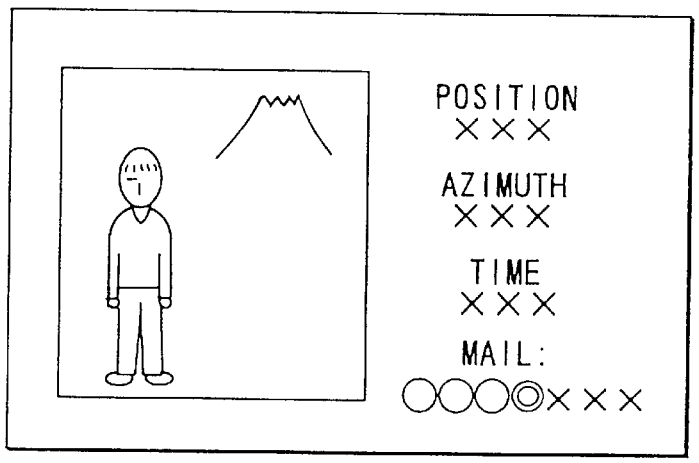

Further, if the user wants to transmit image data displayed on the display unit 65 to the address of the electronic mail displayed as shown in FIG. 22C, he moves the cursor to a position corresponding to the electronic mail address and clicks the mouse so as to permit the PC to transmit a mail transmission request together with the electronic mail address to the server.

The server determines in the step S127 of FIG. 21 that an image data transmission request by the electronic mail is issued from the PC and transmits the image data to the electronic mail address in the step S129.

Further, if the user wants to print image data displayed on the display unit 65, he clicks a print button (not shown) on the display unit 65 by use of the mouse in the display screen of FIG. 16 so as to permit the PC to transmit a print request to the server via the communication network 57.

The server 55 determines the print request from the PC in the step S127 of FIG. 21 and prints the specified image data in the step S131.

Further, the user sometimes wants to input some comment for the displayed image data. In such a case, a comment is input by use of the keyboard unit 61 and the PC 51 transmits the input comment to the server 55. The server 55 determines the comment input request from the PC in the step S127 and writes the comment into the corresponding comment field 54 shown in FIG. 16 in the step S129.

Related data of the image data is not limited to the type described in the above embodiments and may be any type of information if it is related to the image data.

Further, the preset output format includes an output by a printing unit, output by a display unit, output by an audio unit and the like.

Further, the output format is determined based on the related data of the image data in the above embodiments but may be determined based on data different from the related data of the image data.

What is claimed is:

1. An image date outputting method comprising:

adding a photographing time counted by a timer provided in a photographing unit to image data photographed by a user using the photographing unit;

transmitting the image data with the added photographing time to a center unit via a communication line using a communication function of the photographing unit;

receiving, at the center unit, the image data with the added photographing time and transmitted via the communication line;

storing the received image data and the added photographing time data in a memory of the center unit;

automatically editing, at the center unit, the image data based on the time at which the image data was photographed;

outputting the data stored in the memory to a terminal unit provided at the user's home so as to enable the user to edit the image data using the terminal unit, said terminal unit being connected to the center unit via a communication network;

storing the edited image data in the memory of the center unit as album data; and outputting the album data stored in the memory to the terminal unit to be displayed in an album form.

2. The method according to claim 1, further comprising printing the album data stored in the memory using a printer controlled by the center unit.

3. The method according to claim 2, further comprising:

inputting text data to the image data photographed by the photographing unit; and printing the image data in association with the input text data.

4. The method according to claim 1, further comprising:
adding audio data to the image data during an editing operation performed by the user; and
reproducing the added audio data when the album data is output.

5. The method according to claim 1, further comprising:
inputting text data to the photographed image data, in the photographing unit; and
displaying the image data in association with the text data during an editing operation performed by the user.

6. An image data outputting method comprising:
adding characteristic information to image data photographed by a user using a photographing unit;
transmitting the image data with the added characteristic information to a center unit via a communication line using a communication function of the photographing unit;
receiving, at the center unit, the image data with the added characteristic information transmitted via the communication line;
storing the received image data and the added characteristic information in a memory of the center unit;
outputting the image data and the added characteristic information stored in the memory to a terminal unit provided at the user s home so as to enable the user to designate the characteristic information using the terminal unit, said terminal unit being connected to the center unit via a communication network; and
extracting information, related to the characteristic information designated by the user, from a database in the center unit, and outputting the extracted information to the terminal unit.

7. The method according to claim 6, wherein:
the additional characteristic information comprises position information obtained by a position measuring device provided in the photographing unit; and
the extracted information comprises a geographical name of a position at which the image data was photographed, and the database in the center unit stores geographical names in correspondence with the position information.

8. The method according to claim 6, further comprising:
adding audio data to the image data during an editing operation performed by the user to produce album data; and
reproducing the added audio data when the album data is output.

9. The method according to claim 6, further comprising:
inputting text data to the image data, in the photographing unit; and
displaying the image data in association with the text data during an editing operation performed by the user.

10. An image data outputting method comprising:
inputting text data to image data photographed by a user using a photographing unit;
transmitting the image data with the inputted text data to a center unit via a communication line using a communication function of the photographing unit;
receiving, at the center unit, the image data with the inputted text data transmitted via the communication line;
storing the received image data and the inputted text data in a memory of the center unit;
outputting the data stored in the memory to a terminal unit provided at the user's home so as to enable the user to edit the image data using the terminal unit, said terminal unit being connected to the center unit via a communication network;
converting the text data into audio data during an editing operation performed by the user;
storing the edited image data and icon data which represents the converted audio data in the memory of the unit as album data; and
outputting the album data stored in the memory to the terminal unit to be displayed in an album form.

11. The method according to claim 10, further comprising:
inputting mail address data to the photographed image data, in the photographing unit;
receiving at the terminal unit a request by the user for a transmission of the image data to the mail address; and
transmitting, by the center unit, the image data by mail in response to the user's request.

12. The method according to claim 10, further comprising transferring printed material comprising the album data to the user at a remote location.

13. An image data processing system comprising:
an image memory for storing image data photographed by a user using a photographing unit and transmitted via a communication line using a communication function of the photographing unit;
automatic editing means for automatically editing the image data in a format designated by the user, based on related information added to the image data using the photographing unit, the related information including at least one of information relating to a position at which the image data was photographed and information relating to a time at which the image data was photographed;
output means for outputting the image data stored in the image memory to a terminal unit that is provided at the user's home and that is connected to a center unit via a network, so as to enable the user to edit the image data using the terminal unit;
an album memory for storing the image data edited by the user as album data; and
album data-output means for outputting and displaying the album data stored in the album memory on the terminal unit as an album.

14. The system according to claim 13, further comprising control means for printing the album data stored in the album memory in an album form.

15. An image data processing system comprising:
an image memory for storing image data photographed by a user using a photographing unit and transmitted via a communication line using a communication function of the photographing unit;
output means for outputting the image data stored in the image memory to a terminal unit that is provided at the user's home and that is connected to a center unit via a network, so as to enable the user to edit the image data using the terminal unit;
an album memory for storing the edited image data as album data;
album data-output means for outputting and displaying the album data stored in the album memory on the terminal unit as an album;

a database for storing geographical information; and information output means for extracting and outputting geographical information from the database that is related to information input by the photographing unit.

16. The system according to claim 15, wherein:

the information input by the photographing unit includes comprises position information indicating a position am which the image data was photographed;

the database comprises storage means for storing geographical names in correspondence with the position information; and the information output means comprises means for outputting a geographical name corresponding to the position at which the image data was photographed.

17. The system according to claim 15, further comprising transmission means for, when a mail address is added to the image data, transmitting the image data to the mail address.

18. An image data printing method comprising:

receiving, at a center unit and via a communication line, image data photographed by a photographing unit and information related to the image data input from the photographing unit, the information being related to a time at which the image data was photographed;

receiving, at the center unit and via the communication line, a printing format designated by a user through the photographing unit;

automatically editing, at the center unit, the received image data into the designated printing format utilizing the related information; and printing, at the center unit, the edited image data as album data.

19. The method according to claim 18, further comprising transferring printed material comprising the album data to the user at a remote location.

20. An image data printing method comprising:

receiving, at a center unit and via a communication line, image data photographed by a photographing unit and information related to the image data input from the photographing unit, the information being related to a position at which the image data was photographed;

receiving, at the center unit and via the communication line, a printing format designated by a user through the photographing unit;

automatically editing, at the center unit, the received image data into the designated printing format utilizing the related information; and printing, at the center unit, the edited image data as album data.

* * * * *

UNITED STATES PATENT AND TRADEMARK OFFICE
CERTIFICATE OF CORRECTION

PATENT NO. : 6,661,529 B2
DATED : December 9, 2003
INVENTOR(S) : Masao Sanbongi

It is certified that error appears in the above-identified patent and that said Letters Patent is hereby corrected as shown below:

Title page,
Item [56], References Cited, FOREIGN PATENT DOCUMENTS, insert:
-- WO 9607269 A1   3/1996 --
OTHER PUBLICATIONS, insert:
-- Patent Abstracts of Japan, Vol. 95, No. 6, July 31, 1995, & JP 07 064169 A (Matsushita Electric), 10 March 1995. --

Signed and Sealed this

Fourth Day of May, 2004

JON W. DUDAS
*Acting Director of the United States Patent and Trademark Office*